United States Patent
Konya et al.

(10) Patent No.: US 7,615,201 B2
(45) Date of Patent: Nov. 10, 2009

(54) SPHERICAL PARTICLES OF SILICA-CONTAINING COMPOUND OXIDE AND METHOD OF PRODUCTION

(75) Inventors: Yoshiharu Konya, Annaka (JP);
Koichiro Watanabe, Annaka (JP);
Susumu Ueno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 332 days.

(21) Appl. No.: 10/200,190

(22) Filed: Jul. 23, 2002

(65) Prior Publication Data
US 2003/0086855 A1    May 8, 2003

(30) Foreign Application Priority Data
Jul. 23, 2001   (JP) .............................. 2001-221369
Feb. 27, 2002   (JP) .............................. 2002-051535

(51) Int. Cl.
*C01B 33/12*    (2006.01)
*C01F 7/02*     (2006.01)
*C01G 25/02*    (2006.01)
*C01G 23/04*    (2006.01)
*C01G 19/02*    (2006.01)

(52) U.S. Cl. .................... 423/337; 423/325; 423/327.1; 423/335; 423/336; 423/610; 423/624; 423/625; 423/592.1; 423/594.12; 423/598; 423/600; 501/128; 501/53; 501/54; 501/153; 501/154

(58) Field of Classification Search ................ 423/325, 423/326, 327.1, 335, 336, 337, 610, 624, 423/625, 592.1, 598, 594.12, 600; 501/128, 501/53, 54, 153, 154
See application file for complete search history.

(56) References Cited

U.S. PATENT DOCUMENTS

| | | | | | |
|---|---|---|---|---|---|
| 3,416,890 | A | * | 12/1968 | Best et. al. | 423/278 |
| 3,954,945 | A | * | 5/1976 | Lange et al. | 423/336 |
| 4,501,602 | A | * | 2/1985 | Miller et al. | 65/390 |
| 5,043,002 | A | * | 8/1991 | Dobbins et al. | 65/386 |
| 5,424,258 | A | * | 6/1995 | Mangold et al. | 501/128 |
| 5,672,330 | A | | 9/1997 | Hartmann et al. | 423/610 |
| 5,762,914 | A | | 6/1998 | Hartmann et al. | 423/610 |

(Continued)

FOREIGN PATENT DOCUMENTS

JP    02-153816 A    6/1990

(Continued)

OTHER PUBLICATIONS

Safety (MSDS) data for decamethylcyclopentasiloxane, octamethylcyclotetrasiloxane and hexamethylcyclotrisiloxane (no date).*

*Primary Examiner*—Ngoc-Yen M Nguyen
(74) *Attorney, Agent, or Firm*—Birch, Stewart, Kolasch & Birch, LLP

(57) ABSTRACT

By using a halogen-free siloxane and an organometallic compound containing at least one metal other than silicon as feed stocks, and simultaneously atomizing and burning them in a flame, spherical particles of silica-containing compound oxide are prepared which are substantially halogen-free, consist of 0.5-99% by weight of metal oxides and the balance of silica, and have a particle size of 10 nm to 3 µm. The particles are useful as a filler in epoxy resin base semiconductor sealants, a refractive index modifier or the like.

7 Claims, 1 Drawing Sheet

U.S. PATENT DOCUMENTS 5,958,361 A * 9/1999 Laine et al. .................. 423/610
6,022,404 A * 2/2000 Ettlinger et al. ............. 106/404
6,130,020 A * 10/2000 Wada et al. .............. 430/108.6
6,303,256 B1 * 10/2001 Kerner et al. ............ 430/108.6
6,797,447 B2 * 9/2004 Konya et al. ............. 430/108.6

FOREIGN PATENT DOCUMENTS

| JP | 6-127932 | 5/1994 |
| JP | 2503370 | 4/1996 |
| JP | 10-297915 | 11/1998 |
| JP | 11-322324 | 11/1999 |

* cited by examiner

SPHERICAL PARTICLES OF SILICA-CONTAINING COMPOUND OXIDE AND METHOD OF PRODUCTION

This application claims priority under 35 U.S.C. §119 of Japan 2001-221369 and Japan 2002-051535, filed Jul. 23, 2001 and Feb. 27, 2002, respectively.

BACKGROUND OF THE INVENTION

1. Field of the Invention

The present invention relates to spherical silica-containing compound oxide particles useful as, for example, a filler in epoxy resin sealants for IC devices, an abrasive, a conductive agent, a photo-catalyst, an additive for transparent film, and a light-transmissive additive for antireflection film in liquid crystal display devices. The invention also relates to a method of producing such particles, and the use of such particles as an additive for modifying an index of refraction.

2. Prior Art

Several methods for preparing silica-containing compound oxide particles are known in the art. Silica-containing compound oxide particles are prepared, for example, by a method of heating a chlorosilane and a metal chloride for evaporation and effecting hydrolysis in a flame (Japanese Patent No. 2,503,370 corresponding to U.S. Pat. Nos. 5,672,330 and 5,762,914), a method of atomizing and burning a slurry of silica and metal oxide powders dispersed in a combustible liquid (JP-A 10-297915), a method of adding an aqueous colloid sol of dispersed metal oxide microparticulates to a porous spherical silica gel, causing aggregation and drying (JP-A 6-127932), a method of emulsifying a dispersion of titanium dioxide microparticulates in an aqueous alkali silicate solution in an organic solvent with the aid of a surfactant, to thereby form an emulsion, blowing carbon dioxide gas therein, and gelling dispersion droplets (JP-A 11-322324), and a method of contacting silicon tetrachloride in liquid or gas form with titanium dioxide powder for forming a hydrolyzate on particle surfaces (JP-A 7-247118).

However, the method of subjecting chlorosilane and metal chloride to flame hydrolysis has the drawbacks that the chlorine contained in the chlorosilane and metal chloride is not fully removed, and that since the feed stock is to be evaporated by heating, it is limited to a metal chloride which can be evaporated by heating under atmospheric pressure. Further, the method of atomizing and burning a slurry of silica and metal oxide powders in a combustible liquid has the drawback that since silica and metal oxide have different melting points and the powders have an uneven particle size distribution, the start point of melting differs between them, failing to produce a uniform compound oxide. The method of adding a colloid sol of metal oxide to a porous spherical silica gel and drying into a gel has the drawbacks that it takes a time for the colloid sol to fully penetrate into the porous material and for the penetrated colloid sol to dry up, and that the sol undergoes volume shrinkage upon drying, often leaving voids in pores. The method of dispersing titanium dioxide microparticulates in an aqueous alkali silicate solution and emulsifying it in an organic solvent, followed by gelling, enables surfaces of titanium dioxide to be coated with a silica film, but has the drawbacks that it is difficult to uniformly incorporate titanium dioxide within silica and that the alkali metal is left behind. The method of contacting titanium dioxide with silicon tetrachloride for hydrolysis has the drawback that chlorine is left behind.

Meanwhile, several methods of modifying the index of refraction of powder are known in the prior art. Known methods include (1) a method of mixing two or more oxides having different indices of refraction, melting the mixture, cooling the melt for solidification, and grinding the mass into a powder, (2) a method of forming a compound oxide mass by the sol-gel process and grinding the mass, (3) co-hydrolysis of different metal alkoxides in liquid phase, (4) vapor phase hydrolysis of metal alkoxide, and (5) hydrolysis of a vapor mixture of metal chlorides in a flame.

However, the powdering method (1) involving melting and grinding has the problems that the composition tends to undergo segregation upon cooling of the melt, the particle size cannot be reduced below a certain limit, and impurities are entrained during the grinding. The method (2) of grinding the compound oxide mass resulting from the sol-gel process also has the problems that the particle size cannot be reduced below a certain limit, and impurities are entrained during the grinding. The method (3) of metal alkoxide co-hydrolysis in liquid phase has the drawbacks that dropwise addition and reaction is time consuming, the necessity of post-heating at elevated temperature increases the cost, and a limit is imposed on the composite composition in order to prevent crystal grains from growing in the heating step. In the method (4) of evaporating metal alkoxides and hydrolyzing them in a vapor phase, those metal alkoxides having a high boiling point do not develop a high vapor pressure, a limit is imposed on the composite composition, and the resulting particles are ultrafine, with few particles of more than 50 nm in size being available. In the method (5) of hydrolyzing a vapor mixture of metal chlorides in a flame, the metal chloride used are limited to those having a low melting point and a limit is imposed on the composite composition. Chlorine left in the product is also a problem.

SUMMARY OF THE INVENTION

An object of the invention is to provide spherical silica-containing compound oxide particles in which silica is uniformly compounded with a metal oxide other than silica. Another object is to provide a method of producing the same particles. A further object is to provide an additive for modifying an index of refraction.

The inventors have found that by using a halogen-free siloxane and an organometallic compound containing at least one metal other than silicon as feed stocks, and simultaneously atomizing and burning them in a flame, spherical particles of silica-containing compound oxide are obtained in which silica and the metal oxide other than silica are uniformly dispersed and compounded together. The spherical particles are substantially halogen-free, contains the metal oxide other than silicon in an appropriate concentration, and have an appropriate particle size. Of the spherical particles, those particles having an index of refraction of 1.4 to 2.5 are best suited as a light-transmissive filler in epoxy resin sealants for optical IC's, an additive to transparent film, and a refractive index modifier. The present invention is predicated on these findings.

In a first aspect, the present invention provides spherical particles of silica-containing compound oxide which have been prepared by using a halogen-free siloxane and an organometallic compound containing at least one metal other than silicon as feed stocks, and simultaneously atomizing and burning them in a flame and which are substantially halogen-free and have a total content of metal oxides other than silica of 0.5 to 99% by weight, and a particle size of 10 nm to 3 μm.

In a preferred embodiment, the metal other than silicon is at least one element selected from among Ti, Al, Zn, Zr, Sn, Mg, Y, Be and B, preferably the combination of two or three elements selected from among Ti, Al, Zn, Zr, Sn, Mg, Y, Be and B, especially the combination of Ti and Al; Ti, Al and Zr; or Ti, Al and Sn, and the organometallic compound containing the metal is selected from among metal alkoxide compounds, metal acylate compounds, metal alkyl compounds and metal chelate compounds.

The spherical particles preferably have an index of refraction of 1.4 to 2.5 and a light transmittance of at least 90% at the wavelength of visible light (400 to 760 nm).

In a second aspect, the present invention provides an additive for modifying an index of refraction, comprising the spherical particles of silica-containing compound oxide.

In a third aspect, the present invention provides a method for preparing spherical particles of silica-containing compound oxide, comprising the steps of feeding a halogen-free siloxane and an organometallic compound containing at least one metal other than silicon, both in liquid form; and simultaneously atomizing and burning the halogen-free siloxane and the organometallic compound in a flame. In the feeding step, the organometallic compound is fed directly if it is liquid at room temperature or after dissolution in a siloxane, alcohol or hydrocarbon solvent if it is solid at room temperature.

BRIEF DESCRIPTION OF THE DRAWINGS

The objects, features and advantages of the invention will become more apparent from the following detailed description, taken in conjunction with the accompanying drawings.

DESCRIPTION OF THE PREFERRED EMBODIMENTS

Figure 1:
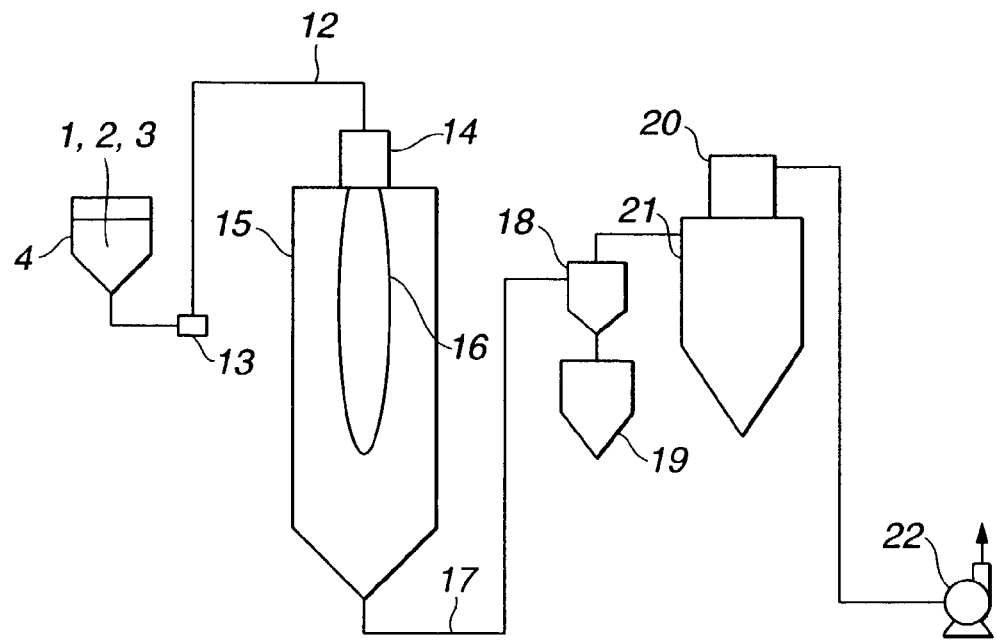
FIG. 1 is a schematic sectional view showing one exemplary reaction system used to work the present invention.

The spherical particles of silica-containing compound oxide according to the invention are prepared by using a halogen-free siloxane and an organometallic compound containing at least one metal other than silicon as feed stocks, and simultaneously atomizing and burning them in a flame; and are substantially halogen-free and have a total content of metal oxides other than silica of 0.5 to 99% by weight, preferably 1 to 99% by weight, and more preferably 5 to 99% by weight, and a particle size of 10 nm to 3 μm and preferably 20 nm to 3 μm. It is noted that the term "metal oxide" as used herein means metal oxides other than silicon oxide (silica).

The metal other than silicon is preferably at least one element selected from the group consisting of Ti, Al, Zn, Zr, Sn, Mg, Y, Be and B, more preferably the combination of two or three elements selected from the group consisting of Ti, Al, Zn, Zr, Sn, Mg, Y, Be and B, especially the combination of Ti and Al; Ti, Al and Zr; or Ti, Al and Sn.

The spherical silica-containing compound oxide particles according to the invention are prepared by simultaneously atomizing a siloxane and an organometallic compound containing at least one metal other than silicon into a flame for oxidative combustion therein for thereby producing spherical silica-containing compound oxide particles containing silica and the metal oxide other than silica. The organometallic compound containing the metal other than silica is selected from among metal alkoxide compounds, metal acylate compounds, metal organic acid compounds, metal alkyl compounds and metal chelate compounds. The organometallic compound is fed directly if it is liquid at room temperature (25° C.), or after conversion to a liquid (or solution) form by dissolving in a siloxane, alcohol or hydrocarbon solvent, if it is solid. The organometallic compound which is in liquid form in either case is atomized and burned simultaneously with the siloxane.

The siloxane as used herein refers to organo(poly)siloxane. The siloxanes used herein include linear organopolysiloxanes having the general formula (1):

 (1)

wherein $R^1$, $R^2$, $R^3$ and $R^4$ may be the same or different and stand for monovalent hydrocarbon groups, alkoxy groups or hydrogen and m is an integer inclusive of 0 ($m \geqq 0$), cyclic organopolysiloxanes having the general formula (2):

 (2)

wherein $R^2$ and $R^3$ are as defined above and n is an integer of at least 3, and branched, partially branched linear, and three-dimensional network organopolysiloxanes having the general formula (3):

 (3)

wherein $R^5$, $R^6$, $R^7$ and $R^8$ may be the same or different and stand for monovalent hydrocarbon groups, alkoxy groups or hydrogen and each of p, q, r and s is an integer inclusive of 0, and mixtures thereof, as long as they are free of halogen.

The preferred monovalent hydrocarbon groups represented by $R^1$ to $R^8$ are those of 1 to 10 carbon atoms, and especially 1 to 8 carbon atoms, for example, alkyl groups such as methyl, ethyl, propyl, isopropyl, butyl, isobutyl, tert-butyl, pentyl, hexyl and cyclohexyl; alkenyl groups such as vinyl, allyl, propenyl, butenyl and hexenyl; aryl groups such as phenyl, and aralkyl groups such as benzyl. Among others, lower alkyl groups such as methyl, ethyl and propyl are preferred, with methyl being most preferred. The alkoxy groups are preferably those of 1 to 6 carbon atoms, such as methoxy and ethoxy, with methoxy being most preferred.

Each of subscripts m, p, q, r and s is an integer of at least 0, and preferably 0 to 100. The subscript n is an integer of at least 3, and preferably 3 to 7. More preferably, m is an integer of 0 to 80, and p+q+r+s is 3 to 80, especially 4 to 50.

Examples of the organosiloxane include hexamethyldisiloxane, octamethyltrisiloxane, octamethylcyclotetrasiloxane, and decamethylcyclopentasiloxane. These siloxanes are preferably those which are purified so as to contain no halogen such as chlorine. Since they have a high purity enough to be substantially free of metal and other impurities, they are best suited as the feed stock from which the spherical silica-containing compound oxide particles are prepared.

The other feed stock used herein is an organometallic compound containing a metal other than silicon. Suitable organometallic compounds used herein include metal alkoxides having the general formula (4):

 (4)

wherein M is a metal element, $OR^{10}$ is an alkoxy group, preferably of 1 to 6 carbon atoms, especially 1 to 4 carbon atoms, such as methoxy, ethoxy, n-propoxy, isopropoxy, n-butoxy, isobutoxy, sec-butoxy, tert-butoxy and pentoxy, and d is an integer of 2 to 4; metal acylate compounds having the general formula (5):

 (5)

wherein $COR^{11}$ is an acyl group, preferably of 1 to 8 carbon atoms, especially 1 to 7 carbon atoms, such as formyl, acetyl, propionyl, butyryl, valeryl, caproyl, heptanoyl or octanoyl, and f is an integer of 2 to 4; metal alkyl compounds having the general formula (6):

$$M(R^{12})_g \quad (6)$$

wherein $R^{12}$ is an alkyl group, preferably of 1 to 8 carbon atoms, such as methyl, ethyl, n-propyl, isopropyl, n-butyl, isobutyl, sec-butyl, tert-butyl, pentyl, hexyl and cyclohexyl, and g is an integer of 2 to 4; and metal chelate compounds having the general formula (7):

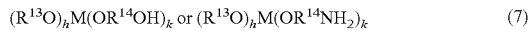
$$(R^{13}O)_h M(OR^{14}OH)_k \text{ or } (R^{13}O)_h M(OR^{14}NH_2)_k \quad (7)$$

wherein $OR^{13}$ is an alkoxy group, preferably of 1 to 6 carbon atoms, especially 1 to 4 carbon atoms, as exemplified for $OR^{10}$, $R^{14}$ is an alkyl group, preferably of 1 to 8 carbon atoms, as exemplified for $R^{12}$, such as methyl, ethyl, propyl and butyl, h and k are integers, h+k is equal to 2 to 4.

Examples of the metal M include titanium, aluminum, zirconium, cerium, boron, zinc, chromium, manganese, magnesium, iron, indium, and tin. Of these, titanium, aluminum, zinc, zirconium, tin, magnesium, yttrium, beryllium, and boron are preferred. These organometallic compounds may contain solvents such as alcohols, but are preferably those purified so as to contain no halogen such as chloride or no sulfur. Since these organometallic compounds have a high purity enough to be substantially free of metal impurities other than the metal oxide intended for compounding, they are best suited as the feed stock from which the spherical silica-containing compound oxide particles are prepared.

For complete oxidative combustion of the organometallic compound and uniform combustion of compounding feed stocks including siloxane, the organometallic compound is preferably used in liquid form so that it may be atomized into fine droplets. It is undesirable that the organometallic compound in solid powder form is burned, because combustion points are non-uniformly distributed so that the product particles vary in composition, combustion becomes incomplete, and more carbon is left in the particles. For this reason, the organometallic compound which is solid at room temperature (e.g., 5 to 35° C.) is preferably dissolved in a siloxane, alcohol or hydrocarbon solvent to form a solution prior to use. The siloxane used as the solvent is selected from the above-illustrated siloxanes to be used as the feed stock, for example, linear and cyclic siloxanes such as hexamethyldisiloxane and octamethylcyclotetrasiloxane. Examples of the alcohol used as the solvent include methanol, ethanol, n-propyl alcohol, isopropyl alcohol, n-butyl alcohol, isobutyl alcohol, sec-butyl alcohol, tert-butyl alcohol. Examples of the hydrocarbon solvent include hexane, cyclohexane, benzene, toluene, xylene, ethylbenzene, diethylbenzene and kerosine.

The siloxane and the organometallic compound or organometallic compound solution may be premixed to form a liquid mixture which is fed to a burner, or individually metered to an in-line mixer (e.g., static mixer) disposed in a feed line system where they are mixed and then fed to a burner. To impart the function of metal oxide compounded with silica, the content of metal oxide(s) other than silica should preferably be 0.5 to 99%, more preferably 1 to 99%, and most preferably 5 to 95% by weight. Then the siloxane and the organometallic compound are mixed and fed so that the combustion oxide may conform to the stoichiometry.

The liquid feedstock mixture is fed to the burner and sprayed or atomized through the nozzle at the tip of the burner. The liquid spraying method may be atomization using an atomizing medium, the pressure of the liquid itself or a centrifugal force. In the spraying method using an atomizing medium, dehumidified air or nitrogen is preferably used as the atomizing medium. The atomized droplets should preferably be very small for complete vaporization and pyrolysis to take place for combustion, and typically have a diameter of up to 100 μm, more preferably up to 50 μm. For atomization of fine droplets, the liquid should preferably have a lower viscosity. The liquid mixture of the siloxane and the organometallic compound should preferably have a viscosity of up to 500 cs at 25° C., more preferably up to 200 cs at 25° C.

The atomized droplets of the siloxane and the organometallic compound are heated by an auxiliary flame of a combustion-assisting gas and a flame of self combustion whereby the droplets undergo oxidative combustion while being vaporized or pyrolyzed. This process produces silica from the siloxane and a metal oxide from the organometallic compound simultaneously in the gas phase, which are fused together to form spherical, typically amorphous, particles of silica-containing compound oxide in which silica and the metal oxide other than silica are uniformly dispersed and compounded.

Combustion forms core particles of silica and metal oxide which coalesce and grow into particles whose ultimate size and shape are determined by the flame temperature, silica and metal oxide concentrations, and residence time within the flame. More particularly, the flame temperature and the concentration of compound particles in the combustion gas are altered by changing the proportion of the feed rate of the feedstock liquid relative to the combustion-supporting gas and combustion-assisting gas fed through the burner. As the proportion of the feed rate of the feedstock liquid relative to the combustion-supporting gas and combustion-assisting gas is increased, the flame temperature elevates and the concentration of compound particles in the combustion gas increases whereby the frequency of collision between produced core particles increases to promote coalescence and growth into larger particles. By contrast, if the proportion of the feed rate of the feedstock liquid is reduced, the flame temperature falls and the concentration of compound particles in the combustion gas also lowers, resulting in finer particles.

To keep the combustion of siloxane and organometallic compound stable and allow complete combustion to occur, an auxiliary flame is formed using a combustion-assisting gas. The combustion-assisting gas used herein is preferably one which does not leave unburned residues following combustion. Suitable, non-limiting examples include hydrogen and hydrocarbon gases such as methane, propane and butane. However, a large amount of combustion-assisting gas, which makes up heat of combustion, results in the formation of combustion by-products such as carbon dioxide and steam, increasing the amount of combustion exhaust and reducing the compound oxide particle concentration during combustion. Accordingly, the amount of combustion-assisting gas is typically set at not more than 2 moles, and preferably from 0.1 to 1.5 moles, per mole of the siloxane and organometallic compound combined.

Moreover, a combustion-supporting gas is added at the time of combustion. The combustion-supporting gas may be any oxygen-containing gas, such as oxygen or air. If the net amount of oxygen in the gas is insufficient, combustion of the siloxane, the organometallic compound and the combustible gas used in the auxiliary flame (combustion-assisting gas) is incomplete, leaving carbon residues in the finished product. On the other hand, if a greater than stoichiometric amount of combustion-supporting gas is used, the silica and metal oxide concentrations within the flame decrease and the flame temperature falls, which tends to suppress coalescence and growth of the product particles. Supplying a large excess of the combustion-supporting gas results in the incomplete combustion of the siloxane and organometallic compound, and excessively increases the load on powder collecting equipment in the exhaust system. Using oxygen as the combustion-supporting gas and supplying a stoichiometric amount of oxygen allows the highest flame temperature to be achieved, but combustion tends to be incomplete. A small excess of oxygen is required to achieve complete combustion. Accordingly, it is advantageous for the combustion-supporting gas fed from the burner to include a molar amount of oxygen which is 1.0 to 4.0 times, and preferably 1.1 to 3.5 times, the stoichiometric amount of oxygen required for combustion. In addition to gas fed from the burner, the combustion-supporting gas may be supplemented by outside gas taken in along the burner.

The size of the spherical silica-containing compound oxide particles formed from combustion can be adjusted by varying the flame temperature and the concentrations of silica and metal oxide in the combustion gas. In the present invention, this adjustment can be achieved in particular by controlling the feed rates of the feedstock liquid of siloxane and organometallic compound, combustion-assisting gas and combustion-supporting gas which are fed to the burner. Besides, there are no limitations concerning the introduction of air or an inert gas such as nitrogen to prevent the deposition of powder on the walls of the combustion furnace or to cool the exhaust gases following combustion.

The furnace is operated under negative pressure by drawing off the exhaust with an exhaust unit such as a blower provided on the exhaust side of the furnace. The spherical silica-containing compound oxide particles in which silica and metal oxide are compounded as a result of combustion are separated and collected by means of a cyclone, pneumatic classifier and bag filter provided along the exhaust route, after which the exhaust is discharged from the system by the exhaust unit. Because the siloxane and organometallic compound contain no halogen, acidic corrosive gases such as hydrogen chloride do not form as by-products of combustion, eliminating the need to use special-grade materials in the various system components, such as the furnace proper, flue lines, collectors, recovery units, and exhaust unit. Nor is there any need for equipment to treat the exhaust.

The thus obtained silica-containing compound oxide particles in which silica and metal oxide are compounded are spherical in shape, contain substantially no halogen, and have a total content of metal oxides other than silica of 0.5 to 99% by weight and a particle size of 10 nm to 3 μm.

There have been described spherical particles of silica-containing compound oxide which have been prepared by using as feed stocks a halogen-free siloxane and an organometallic compound containing at least one metal other than silicon, preferably an organometallic compound which is liquid at room temperature or a solution of an organometallic compound, and simultaneously atomizing and burning them in a flame, such that the particles are substantially halogen-free and have a total content of metal oxides other than silica of 0.5 to 99%, preferably 1 to 99%, more preferably 5 to 95% by weight, and a particle size of 10 nm to 3 μm, preferably 20 nm to 3 μm.

The spherical silica-containing compound oxide particles of the invention should preferably have an index of refraction in the range of 1.4 to 2.5 and specifically, a light transmittance of at least 90%, especially at least 95%, at the wavelength of visible light (400 to 760 nm). Since spherical silica-containing compound oxide particles in which silica and metal oxide(s) having different indices of refraction are uniformly dispersed in the predetermined composition are prepared by using a halogen-free siloxane and an organometallic compound containing at least one metal other than silicon as feed stocks and simultaneously atomizing and burning them in a flame, it is possible to adjust the particle size and index of refraction of the spherical silica-containing compound oxide particles. The spherical silica-containing compound oxide particles having the above-described index of refraction and especially the above-described light transmittance are useful as an additive for modifying an index of refraction, for example, a filler in light-transmissive epoxy resins for optical IC's, a surface coating agent for light-transmissive film, and an additive to antireflection film in liquid crystal display units because such advantages as transparency and antireflection are obtainable.

The spherical silica-containing compound oxide particles of the invention should preferably have a sphericity of at least 0.8 (i.e., 0.8 to 1), more preferably at least 0.85 (i.e., 0.85 to 1), the sphericity being defined as the ratio of minor diameter to major diameter of particles. Such particles having a high sphericity in which silica and at least one metal oxide having a desired function are compounded while maintaining silica's characteristics have the advantages that better flow, burr and heat transfer properties are obtainable when the particles are used as a filler in epoxy resin encapsulants for IC's, and antibacterial, deodorant, anti-fouling and anti-hazing effects are exerted when the particles are used as a photo-catalyst.

Figure 2:
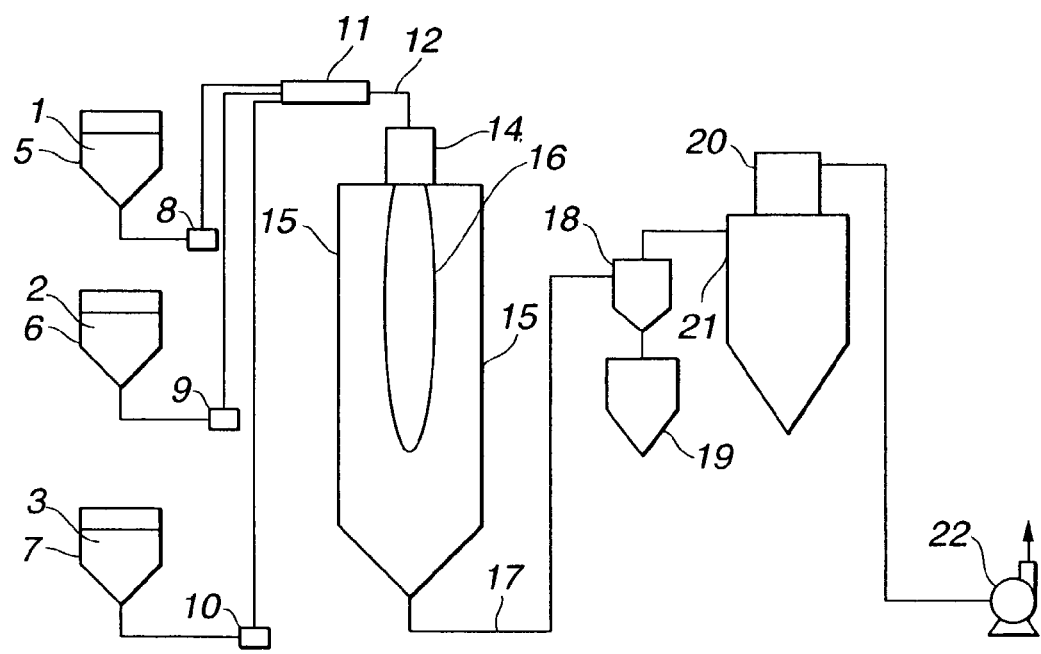
FIG. 2 is a schematic sectional view showing another exemplary reaction system used in the invention.

Referring to the drawings, the reaction apparatus used to manufacture the spherical silica-containing compound oxide particles of the invention is now described. FIGS. 1 and 2 show schematic sectional views of different examples of production systems suitable for this purpose. FIG. 1 illustrates a production method in which a liquid mixture of the siloxane and organometallic compound is fed to the burner and subjected to atomization and combustion. FIG. 2 illustrates another production method in which the siloxane and organometallic compound are individually fed to a static mixer intermediate the feed line where they are mixed and the liquid mixture is fed to the burner and subjected to atomization and combustion.

In FIG. 1, a liquid mixture of a siloxane 1, an organometallic compound 2 and another organometallic compound 3 is passed by a metering pump 13 from a stock tank 4 through a feed line 12 and to a burner 14 equipped with an atomizing nozzle (not shown) at the end thereof. The liquid mixture of siloxane 1 and organometallic compounds 2 and 3 is atomized within a combustion furnace 15, where it is ignited by an auxiliary flame, thereby forming a combustion flame 16. The spherical silica-containing compound oxide particles formed by combustion are cooled together with the exhaust in a flue line 17, separated off by a pneumatic classifier 18 and a bag filter 20, and collected in recovery units 19 and 21. The exhaust is then discharged by an exhaust unit 22.

The production system shown in FIG. 2 is like that in FIG. 1, except that the siloxane 1, the organometallic compound 2 and the other organometallic compound 3 are contained in separate pressurized tanks 5, 6 and 7, and individually fed to a static mixer 11 by metering pumps 8, 9 and 10, respectively, whereupon the liquid mixture is fed through the feed line 12 to the burner 14.

Although the embodiments using two organometallic compounds are illustrated in FIGS. 1 and 2, the invention is not limited thereto. It is acceptable to use only one organometallic compound or more than two organometallic compounds.

EXAMPLE

Examples and comparative examples are given below by way of illustration and not by way of limitation. Below, wt % is percents by weight and hr is hour.

Examples 1-7

The production system shown in FIG. 1 was used. A feed solution was prepared by selecting one siloxane from hexamethyldisiloxane and octamethylcyclotetrasiloxane, and two or three organometallic compounds from among tetraisopropoxytitanium (colorless liquid), a 70 wt % isopropyl alcohol solution of triisopropoxyaluminum (white solid), a 70 wt % toluene solution of tetra-n-butoxyzirconium (pale yellow solid), and a 60% toluene solution of diethoxyzinc (white solid) and mixing the siloxane with the organometallic compounds in a predetermined concentration. The feed solution at room temperature was fed to the burner 14 at the top of the vertical combustion furnace 15. The feed solution was atomized into fine droplets through the nozzle at the burner end with the aid of nitrogen gas as the atomizing medium and burned in an auxiliary flame produced by the combustion of propane. Oxygen and air were fed through the burner 14 as the combustion-supporting gas. Table 1 shows the composition of siloxane and organometallic compounds mixed and the feed rates of the feed solution, propane, oxygen, air and atomizing nitrogen. A powder of spherical silica-containing compound oxide particles thus produced was collected by the pneumatic classifier 18 and bag filter 20.

The powders recovered in this way were analyzed by ion chromatography, finding a chlorine content of less than 0.1 ppm in any case. The powders recovered were analyzed by x-ray diffractometry, finding no crystalline phase in any case, that is, they were amorphous. The composition was analyzed by randomly taking five samples from each recovered powder and found to be uniform. The particle size was determined by taking a photograph under a transmission electron microscope, and making particle shape analysis on the photomicrograph using an image analyzer Luzex F (Nireco Corp.). All particles were spherical as demonstrated by a sphericity of at least 0.85, the sphericity being the ratio of minor diameter to major diameter of particles. The particle size is also shown in Table 1.

poxytitanium, triisopropoxyaluminum solution, propane, oxygen, air and atomizing nitrogen.

The recovered powders of compound oxide particles having silica, titania and alumina compounded were analyzed and measured as in Examples 1-6, finding a chlorine content of less than 0.1 ppm, a carbon content of less than 0.1% by weight (i.e., trace), and a sphericity of at least 0.85. The powders were amorphous and had a uniform composition. The particle size is shown in Table 2.

TABLE 2

|  |  | Example | |
|---|---|---|---|
|  |  | 8 | 9 |
| Feed rate | Hexamethyldisiloxane (kg/hr) | 4.2 | 3.5 |
|  | Tetraisopropoxytitanium (kg/hr) | 1.2 | 3.0 |
|  | Triisopropoxyaluminum solution (kg/hr) | 0.6 | 1.5 |
|  | Mixed feed solution (kg/hr) | 6.0 | 8.0 |
|  | Propane (Nm$^3$/hr) | 0.2 | 0.2 |
|  | Oxygen (Nm$^3$/hr) | 15.0 | 18.0 |
|  | Air (Nm$^3$/hr) | 12.0 | 9.0 |
|  | Atomizing N$_2$ (Nm$^3$/hr) | 1.8 | 2.0 |
| Product composition | Silica (wt %) | 86.4 | 68.0 |
|  | Titania (wt %) | 9.4 | 22.1 |
|  | Alumina (wt %) | 4.2 | 9.9 |
|  | Total (wt %) | 100 | 100 |
| Size of recovered particles (nm) |  | 50-200 | 80-350 |

TABLE 1

|  |  | Example | | | | | | |
|---|---|---|---|---|---|---|---|---|
|  |  | 1 | 2 | 3 | 4 | 5 | 6 | 7 |
| Feedstock composition | Hexamethyldisiloxane (wt %) | 70 | 30 | 5 | 40 | 45 | 80 | 0 |
|  | Octamethylcyclotetrasiloxane (wt %) | 0 | 0 | 0 | 0 | 0 | 0 | 40 |
|  | Tetraisopropoxytitanium (wt %) | 20 | 40 | 65 | 40 | 45 | 15 | 30 |
|  | Triisopropoxyaluminum solution (wt %) | 10 | 30 | 20 | 0 | 10 | 5 | 30 |
|  | Tetra-n-butoxyzirconium solution (wt %) | 0 | 0 | 10 | 20 | 0 | 0 | 0 |
|  | Total (wt %) | 100 | 100 | 100 | 100 | 100 | 100 | 100 |
| Feed rate | Feed solution (kg/hr) | 6.0 | 7.0 | 5.5 | 3.0 | 8.0 | 12.0 | 7.0 |
|  | Propane (Nm$^3$/hr) | 0.2 | 0.2 | 0.3 | 0.4 | 0.2 | 0.1 | 0.2 |
|  | Oxygen (Nm$^3$/hr) | 15.0 | 16.0 | 13.0 | 8.0 | 18.0 | 20.0 | 17.0 |
|  | Air (Nm$^3$/hr) | 12.0 | 11.0 | 15.0 | 22.0 | 10.0 | 9.0 | 10.0 |
|  | Atomizing N$_2$ (Nm$^3$/hr) | 1.8 | 2.0 | 1.6 | 1.5 | 2.2 | 2.4 | 2.0 |
| Product composition | Silica (wt %) | 86.4 | 54.2 | 12.3 | 62.6 | 68.7 | 91.6 | 67.0 |
|  | Titania (wt %) | 9.4 | 27.5 | 60.5 | 23.8 | 26.1 | 6.5 | 17.5 |
|  | Alumina (wt %) | 4.2 | 18.3 | 16.5 | 0 | 5.2 | 1.9 | 15.5 |
|  | Zirconia (wt %) | 0 | 0 | 10.7 | 13.6 | 0 | 0 | 0 |
|  | Total (wt %) | 100 | 100 | 100 | 100 | 100 | 100 | 100 |
| Size of recovered particles |  | 50-200 nm | 60-250 nm | 100-400 nm | 10-50 nm | 0.2-1.0 µm | 0.4-2.7 µm | 30-150 nm |

Examples 8-9

The production system shown in FIG. 2 was used. Hexamethyldisiloxane, tetraisopropoxytitanium, and a 70 wt % isopropyl alcohol solution of triisopropoxyaluminum at room temperature were individually fed to the static mixer 11. The mixture was fed to the burner 14 at the top of the vertical combustion furnace 15 and atomized and burned. Table 2 shows the feed rates of hexamethyldisiloxane, tetraisopro- Examples 10-16

The production system shown in FIG. 1 was used. A feed solution was prepared by selecting one siloxane from hexamethyldisiloxane and octamethylcyclotetrasiloxane, and two or three liquid organometallic compounds from among tetraisopropoxytitanium, tri-sec-butoxyaluminum and tetrapropyltin and mixing the siloxane with the organometallic compounds in a predetermined concentration. The feed solution at room temperature was fed to the burner 14 at the top of the vertical combustion furnace 15. The feed solution was atomized into fine droplets through the nozzle at the burner end with the aid of nitrogen gas as the atomizing medium and burned in an auxiliary flame produced by the combustion of propane. Oxygen and air were fed through the burner 14 as the combustion-supporting gas. Table 3 shows the composition of siloxane and organometallic compounds mixed and the feed rates of the feed solution, propane, oxygen, air and atomizing nitrogen. The spherical silica-containing compound oxide particles thus produced were collected by the pneumatic classifier 18 and bag filter 20.

The powders recovered were analyzed by ion chromatography, finding a chlorine content of less than 0.1 ppm in any case. The powders recovered were analyzed by x-ray diffractometry, finding no crystalline phase in any case, that is, they were amorphous. The composition was analyzed by randomly taking five samples from each recovered powder and found to be uniform. The index of refraction was measured by furnishing several liquids or resins having different indices of refraction, mixing a powder sample with the liquids or resins and dispersing therein, measuring the light transmittance at a wavelength of 580 nm of the mixed liquids or resins by a spectrophotometer, and measuring the index of refraction of the mixed liquid or resin having the highest light transmittance by an Abbe refractometer. The highest transmittance exceeded 90% in all cases. The particle size was determined by taking a photograph under a transmission electron microscope, and making particle shape analysis on the photomicrograph using an image analyzer Luzex F (Nireco Corp.). All particles were spherical as demonstrated by a sphericity of at least 0.85, the sphericity being the ratio of minor diameter to major diameter of particles. The composition, size and index of refraction of the particles produced are shown in Table 3.

ethoxyaluminum and tetramethoxytitanium mixed and the feed rates of the slurry, propane, oxygen, air and atomizing nitrogen.

The recovered powder had a chlorine content of less than 0.1 ppm, but had been unevenly spherodized due to unstable combustion as demonstrated by a sphericity of at least 0.65, contained 3.1% by weight of carbon due to incomplete combustion of the metal alkoxide powders, and had a largely varying composition. The particle size is shown in Table 4.

TABLE 4

|  |  | Comparative Example 1 |
|---|---|---|
| Feedstock composition | Hexamethyldisiloxane (wt %) | 30 |
|  | Tetramethoxytitanium (wt %) | 40 |
|  | Triethoxyaluminum (wt %) | 30 |
|  | Total (wt %) | 100 |
| Feed rate | Slurry (kg/hr) | 7.0 |
|  | Propane (Nm$^3$/hr) | 0.2 |
|  | Oxygen (Nm$^3$/hr) | 16.0 |
|  | Air (Nm$^3$/hr) | 11.0 |
|  | Atomizing N$_2$ (Nm$^3$/hr) | 2.4 |
| Product composition | Silica (wt %) | 41-48 |
|  | Titania (wt %) | 34-40 |
|  | Alumina (wt %) | 16-21 |
|  | Total (wt %) | 100 |
| Size of recovered particles (nm) |  | 10-200 |

Comparative Example 2

Combustion was carried out as in Example 1 except that a slurry of tetramethoxytitanium (white powder) in hexameth-

TABLE 3

|  |  | Example | | | | | | |
|---|---|---|---|---|---|---|---|---|
|  |  | 10 | 11 | 12 | 13 | 14 | 15 | 16 |
| Feedstock composition | Hexamethyldisiloxane (wt %) | 53.3 | 87.8 | 2.0 | 34.2 | 30.1 | 23.8 | 0.0 |
|  | Octamethylcyclotetrasiloxane (wt %) | 0.0 | 0.0 | 0.0 | 0.0 | 0.0 | 0.0 | 20.6 |
|  | Tetraisopropoxytitanium (wt %) | 46.7 | 12.2 | 98.0 | 0.0 | 50.4 | 54.9 | 52.6 |
|  | Tri-sec-butoxyaluminum (wt %) | 0.0 | 0.0 | 0.0 | 65.8 | 19.5 | 0.0 | 26.8 |
|  | Tetrapropyltin (wt %) | 0.0 | 0.0 | 0.0 | 0.0 | 0.0 | 21.3 | 0.0 |
|  | Total (wt %) | 100.0 | 100.0 | 100.0 | 100.0 | 100.0 | 100.0 | 100.0 |
| Feed rate | Feed solution (kg/hr) | 6.0 | 12.0 | 3.5 | 7.5 | 6.0 | 8.0 | 9.5 |
|  | Propane (Nm$^3$/hr) | 0.20 | 0.15 | 0.30 | 0.20 | 0.20 | 0.20 | 0.20 |
|  | Oxygen (Nm$^3$/hr) | 15.0 | 20.0 | 10.0 | 15.0 | 12.0 | 13.0 | 16.0 |
|  | Air (Nm$^3$/hr) | 15.0 | 10.0 | 20.0 | 15.0 | 15.0 | 12.0 | 12.0 |
|  | Atomizing N$_2$ (Nm$^3$/hr) | 1.8 | 2.4 | 1.2 | 2.0 | 1.8 | 2.1 | 2.2 |
| Product composition | Silica (wt %) | 75.0 | 95.0 | 5.0 | 65.0 | 55.0 | 40.0 | 45.0 |
|  | Titania (wt %) | 25.0 | 5.0 | 95.0 | 0.0 | 35.0 | 35.0 | 40.0 |
|  | Alumina (wt %) | 0.0 | 0.0 | 0.0 | 35.0 | 10.0 | 0.0 | 15.0 |
|  | Tin oxide (wt %) | 0.0 | 0.0 | 0.0 | 0.0 | 0.0 | 25.0 | 0.0 |
|  | Total (wt %) | 100.0 | 100.0 | 100.0 | 100.0 | 100.0 | 100.0 | 100.0 |
| Size of recovered particles (nm) |  | 40-190 | 450-2800 | 30-80 | 120-500 | 60-210 | 160-700 | 150-600 |
| Index of refraction |  | 1.66 | 1.52 | 2.43 | 1.52 | 1.79 | 1.88 | 1.85 |

Comparative Example 1

Combustion was carried out as in Example 1 except that a slurry of tetramethoxytitanium (white powder) and triethoxyaluminum (white powder) in hexamethyldisiloxane was fed to the burner 14 for atomization and combustion. A powder of spherical compound oxide particles having silica, titania and alumina compounded together was collected and recovered. Table 4 shows the composition of hexamethyldisiloxane, triyldisiloxane was fed to the burner 14 for atomization and combustion. A powder of spherical compound oxide particles having silica and titania compounded together was collected and recovered. Table 5 shows the composition of hexamethyldisiloxane and tetramethoxytitanium mixed and the feed rates of the slurry, propane, oxygen, air and atomizing nitrogen.

The recovered powder had a chlorine content of less than 0.1 ppm, but contained many fused particles and had been insufficiently spherodized as demonstrated by a sphericity of 0.73 due to unstable combustion, contained 3.2% by weight of carbon due to incomplete combustion of the metal alkoxide powder, and had a largely varying composition. The powder was mixed with resins, which were measured for light transmittance by a spectrophotometer. Since the mixed resins were white turbid due to voids between fused particles, they all had a transmittance of 65 to 68% and failed to show a definite highest transmittance. Thus an index of refraction could not be measured. The particle size is shown in Table 5.

TABLE 5

|  |  | Comparative Example 2 |
|---|---|---|
| Feedstock composition | Hexamethyldisiloxane (wt %) | 65.3 |
|  | Tetramethoxytitanium (wt %) | 34.7 |
|  | Total (wt %) | 100.0 |
|  | Slurry (kg/hr) | 6.0 |
|  | Propane (Nm$^3$/hr) | 0.20 |
| Feed rate | Oxygen (Nm$^3$/hr) | 12.0 |
|  | Air (Nm$^3$/hr) | 13.0 |
|  | Atomizing N$_2$ (Nm$^3$/hr) | 2.0 |
| Product composition | Silica (wt %) | 70-80 |
|  | Titania (wt %) | 20-30 |
|  | Total (wt %) | 100.0 |
| Size of recovered particles (nm) |  | 20-250 |
| Index of refraction |  | unmeasurable |

Comparative Example 3

A gel arising from hydrolysis of a mixed solution of tetraethoxytitanium and tetraisopropoxytitanium by the sol-gel process was heated at 900° C., yielding an amorphous compound oxide of silica and titania (titania content 12 wt %) in mass form. The mass was ground in a ball mill of alumina, obtaining a particle powder having a mean particle size of 15 μm. The particles were angular and had a sphericity of 0.63. As a result of grinding, 0.1% by weight of alumina was introduced into the powder, which caused scattering upon light irradiation. The transmittance as measured by a spectrophotometer was 80% at the highest, indicating poor transparency.

According to the present invention, by using a siloxane purified to be halogen-free and an organometallic compound as feed stocks, and atomizing and burning them simultaneously in a flame, there are spherical particles of silica-containing compound oxide which do not substantially contain halogen and carbon attributable to the organometallic compound and in which silica is compounded with 0.5 to 99% by weight of metal oxides other than silica. Advantageously, spherical particles of silica-containing compound oxide having a particle size of 10 nm to 3 μm are obtained by controlling the feed rates of a feed solution of siloxane and organometallic compound, combustion-assisting gas and combustion-supporting gas fed to the burner. The particles are useful as a filler in IC epoxy resin sealants, an abrasive, a conductive agent, a photo-catalyst, an additive to transparent film, a light transmissive additive to antireflection film in LC devices, and a refractive index modifier.

Japanese Patent Application Nos. 2001-221369 and 2002-051535 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing spherical particles of silica-containing compound oxide consisting of 12.3 to 91.6% by weight of silica and the balance of at least two metal oxides other than silica wherein the metal oxides other than silica are selected from Ti, Al, Zr and Sn, comprising the steps of:

feeding a halogen-free siloxane and at least two organometallic compounds each containing a metal other than silicon in liquid mixture form, said organometallic compound being used directly if it is liquid or after dissolution in a siloxane, alcohol or hydrocarbon solvent if it is solid, the halogen-free siloxane being selected from the group consisting of:

an organopolysiloxane having the general formula (1):

$$(R^1)_3SiO(SiR^2R^3O)_mSi(R^4)_3 \quad (1)$$

wherein $R^1$, $R^2$, $R^3$ and $R^4$ may be the same or different and stand for monovalent hydrocarbon groups, alkoxy groups or hydrogen and m is an integer inclusive of 0 to 100;

an organopolysiloxane having the general formula (2):

$$(SiR^2R^3O)_n \quad (2)$$

wherein $R^2$ and $R^3$ are as defined above and n is an integer of 3 to 7; and an organopolysiloxane having the general formula (3):

$$(SiR^6O_{3/2})_p(SiO_2)_q(SiR^7R^8O)_r(Si(R^5)_3O_{1/2})_s \quad (3)$$

wherein $R^5$, $R^6$, $R^7$ and $R^8$ may be the same or different and stand for monovalent hydrocarbon groups, alkoxy groups or hydrogen and each of p, q, r and s is an integer inclusive of 0, and p+q+r+s is 3 to 80, and mixtures thereof, as long as they are free of halogen, the organometallic compound being selected from the group consisting of:

a metal alkoxide having the general formula (4):

$$M(OR^{10})_d \quad (4)$$

wherein M is a metal element selected from the group consisting of Ti, Al, Zr and Sn, $OR^{10}$ is an alkoxy group having 1 to 6 carbon atoms, and d is an integer of 2 to 4;

a metal acylate compound having the general formula (5):

$$M(OCOR^{11})_f \quad (5)$$

wherein $COR^{11}$ is an acyl group having 1 to 8 carbon atoms and f is an integer of 2 to 4;

a metal alkyl compound having the general formula (6): and $$M(R^{12})_g \quad (6)$$

wherein $R^{12}$ is an alkyl group having 1 to 8 carbon atoms and g is an integer of 2 to 4;

the halogen-free siloxane and the organometallic compound being fed so that 12.3 to 91.6% by weight of silica and the balance of at least two metal oxides other than silica are formed, and simultaneously atomizing and burning said halogen-free siloxane and said organometallic compound in a flame, wherein a hydrocarbon gas is fed as a combustion-assisting gas in an amount of 0.1 to 2 moles per mole of the siloxane and organometallic compounds combined, and an oxygen-containing gas is fed as a combustion-supporting gas in such an amount that a molar amount of oxygen is 1.0 to 4.0 times of the stoichiometric amount of oxygen required for combustion, and thereby obtaining spherical particles being substantially halogen-free and having a particle size of 10 nm to 3 μm, wherein the spherical particles have a light transmittance of at least 90% at a wavelength of visible light (400 to 760 nm).

2. The method as set forth in claim 1, wherein the metal other than silicon is the combination of Ti and Al; Ti and Zr; Ti and Sn; Ti, Al and Zr; or Ti, Al and Sn.

3. The method as set forth in claim 1, wherein the spherical particles have a particle size of 20 nm to 3 μm.

4. The method as set forth in claim 1, wherein the metal other than silicon is the combination of Ti and Al.

5. The method as set forth in claim 1, wherein the metal other than silicon is the combination of Ti and Zr.

6. The method as set forth in claim 1, wherein the metal other than silicon is the combination of Ti and Sn.

7. The method as set forth in claim 1, wherein the metal other than silicon is the combination of Ti, Al and Zr.

* * * * *